United States Patent
Li et al.

(10) Patent No.: US 10,924,900 B2
(45) Date of Patent: Feb. 16, 2021

(54) CHARGING METHOD AND APPARATUS, AND SYSTEM

(71) Applicant: Huawei Technologies Co., Ltd., Shenzhen (CN)

(72) Inventors: Li Li, Shenzhen (CN); Runze Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/054,615

(22) Filed: Aug. 3, 2018

(65) Prior Publication Data
US 2018/0343347 A1    Nov. 29, 2018

Related U.S. Application Data

(63) Continuation of application No. PCT/CN2016/111517, filed on Dec. 22, 2016.

(30) Foreign Application Priority Data

Feb. 4, 2016    (CN) .......................... 2016 1 0079306

(51) Int. Cl.
*H04W 4/24* (2018.01)
*H04W 4/50* (2018.01)
(Continued)

(52) U.S. Cl.
CPC .............. *H04W 4/24* (2013.01); *G06Q 40/12* (2013.12); *H04L 12/14* (2013.01); *H04L 12/141* (2013.01);
(Continued)

(58) Field of Classification Search
CPC ...... G06Q 40/12; H04L 43/0876–0894; H04L 67/14–148; H04L 67/22;
(Continued)

(56) References Cited

U.S. PATENT DOCUMENTS

| 2010/0150046 A1* | 6/2010 | Li | H04L 12/14 370/311 |
| 2012/0324100 A1* | 12/2012 | Tomici | H04M 15/66 709/224 |

(Continued)

FOREIGN PATENT DOCUMENTS

| CN | 101374055 A | * 2/2009 | ............. H04L 12/14 |
| CN | 101374055 A | 2/2009 | |

(Continued)

OTHER PUBLICATIONS

Foreign Communication From a Counterpart Application, PCT Application No. PCT/CN2016/111517, English Translation of Written Opinion dated Mar. 1, 2017, 6 pages.*

(Continued)

*Primary Examiner* — Timothy J Weidner
(74) *Attorney, Agent, or Firm* — Conley Rose, P.C.

(57) ABSTRACT

A charging method, including sending, by a control plane gateway, a first charging trigger event to a user plane gateway, where the first charging trigger event triggering the user plane gateway to generate service usage information, generating, by the user plane gateway, the service usage information when the user plane gateway detects that the first charging trigger event occurs, sending, by the user plane gateway, the service usage information to the control plane gateway, generating, by the control plane gateway, a charging request according to the service usage information, and sending, by the control plane gateway, the charging request to a charging system. Offline charging during packet data network gateway (PGW) control and user (CU) separation is implemented.

20 Claims, 5 Drawing Sheets

(51) Int. Cl.
| | |
|---|---|
| *H04W 8/18* | (2009.01) |
| *H04W 8/20* | (2009.01) |
| *H04W 60/04* | (2009.01) |
| *H04W 88/16* | (2009.01) |
| *H04W 92/02* | (2009.01) |
| *H04W 92/06* | (2009.01) |
| *H04M 15/00* | (2006.01) |
| *H04L 12/14* | (2006.01) |
| *H04L 12/24* | (2006.01) |
| *H04L 12/26* | (2006.01) |
| *H04L 29/08* | (2006.01) |
| *G06Q 40/00* | (2012.01) |

(52) U.S. Cl.
CPC ...... *H04L 12/1407* (2013.01); *H04L 12/1425* (2013.01); *H04L 12/1442* (2013.01); *H04L 12/1482* (2013.01); *H04L 41/5032* (2013.01); *H04L 43/062* (2013.01); *H04L 43/065* (2013.01); *H04L 67/22* (2013.01); *H04M 15/55* (2013.01); *H04M 15/58* (2013.01); *H04M 15/60* (2013.01); *H04M 15/61* (2013.01); *H04M 15/62* (2013.01); *H04M 15/64* (2013.01); *H04M 15/65* (2013.01); *H04M 15/66* (2013.01); *H04M 15/67* (2013.01); *H04M 15/81* (2013.01); *H04M 15/8214* (2013.01); *H04M 15/8278* (2013.01); *H04W 4/50* (2018.02); *H04W 8/183* (2013.01); *H04W 8/20* (2013.01); *H04W 60/04* (2013.01); *H04M 2215/2046* (2013.01); *H04M 2215/22* (2013.01); *H04W 88/16* (2013.01); *H04W 92/02* (2013.01); *H04W 92/06* (2013.01)

(58) Field of Classification Search
CPC . H04L 12/14–1496; H04L 41/50–5096; H04L 43/06–08; H04M 15/04–93; H04W 4/24; H04W 4/50; H04W 8/18–205; H04W 28/02; H04W 28/0268; H04W 28/0278; H04W 28/16–26; H04W 60/04; H04W 68/12; H04W 88/16; H04W 92/02; H04W 92/04; H04W 92/06
See application file for complete search history.

(56) References Cited

U.S. PATENT DOCUMENTS

| | | | | |
|---|---|---|---|---|
| 2015/0111531 | A1* | 4/2015 | Cai | H04L 12/1403 455/406 |
| 2015/0117408 | A1 | 4/2015 | Kedalagudde et al. | |
| 2016/0164691 | A1* | 6/2016 | Wang | H04L 12/1407 370/259 |
| 2017/0026523 | A1 | 1/2017 | Wang et al. | |

FOREIGN PATENT DOCUMENTS

| | | | | |
|---|---|---|---|---|
| CN | 102118729 | A | 7/2011 | |
| CN | 102209309 | A | 10/2011 | |
| CN | 103517245 | A | 1/2014 | |
| CN | 103684802 | A | 3/2014 | |
| CN | 104349298 | A | 2/2015 | |
| CN | 105515793 | A | 4/2016 | |
| EP | 2180683 | A1 | 4/2010 | |
| EP | 2180683 | A1 * | 4/2010 | ............. H04L 12/14 |
| EP | 2509256 | B1 | 9/2017 | |
| WO | 2014000302 | A1 | 1/2014 | |
| WO | WO-2014000302 | A1 * | 1/2014 | ......... H04L 12/1403 |
| WO | 2014169865 | A1 | 10/2014 | |
| WO | WO-2014169865 | A1 * | 10/2014 | ............ H04M 15/52 |
| WO | 2015065701 | A1 | 5/2015 | |
| WO | WO-2015065701 | A1 * | 5/2015 | ........ H04W 36/0027 |
| WO | 2017219905 | A1 | 12/2017 | |

OTHER PUBLICATIONS

Foreign Communication From a Counterpart Application, European Application No. 16889148.9, Extended European Search Report dated Dec. 5, 2018, 10 pages.*
Foreign Communication From a Counterpart Application, Chinese Application No. 201610079306.X, English Translation of Chinese First Office Action dated May 30, 2019, 12 pages.*
Machine Translation and Abstract of Chinese Publication No. CN102118729, Jul. 6, 2011, 20 pages.
Machine Translation and Abstract of Chinese Publication No. CN105515793, Apr. 20, 2016, 21 pages.
Foreign Communication From a Counterpart Application, PCT Application No. PCT/CN2016/111517, English Translation of International Search Report dated Mar. 1, 2017, 6 pages.
Machine Translation and Abstract of International Publication No. WO2014169865, Oct. 23, 2014, 26 pages.
Machine Translation and Abstract of International Publication No. WO2017219905, Dec. 28, 2017, 39 pages.
Foreign Communication From a Counterpart Application, Chinese Application No. 201610079306.X, Chinese Office Action dated May 30, 2019, 11 pages.
Machine Translation and Abstract of Chinese Publication No. CN103517245, Jan. 15, 2014, 31 pages.
Machine Translation and Abstract of Chinese Publication No. CN103684802, Mar. 26, 2014, 20 pages.
Foreign Communication From a Counterpart Application, Chinese Application No. 201610079306.X, Chinese Office Action dated Dec. 9, 2019, 11 pages.

* cited by examiner

CHARGING METHOD AND APPARATUS, AND SYSTEM

CROSS-REFERENCE TO RELATED APPLICATIONS

This application is a continuation of International Patent Application No. PCT/CN2016/111517 filed on Dec. 22, 2016, which claims priority to Chinese Patent Application No. 201610079306.X filed on Feb. 4, 2016. The disclosures of the aforementioned applications are hereby incorporated by reference in their entireties.

TECHNICAL FIELD

The present disclosure relates to the communications field, and in particular, to a charging method and apparatus, and a system.

BACKGROUND

In a current evolved packet core (EPC) network architecture, data packets sent/received by a terminal need to be processed and offloaded using a packet data network (PDN) gateway (PGW). The PGW is located at a higher layer of a network. Consequently, each data packet needs to be forwarded and processed only after being transmitted for a long distance in the network. In this case, the third generation partnership project (3GPP) proposes a concept of control and user (CU) separation, that is, splitting a PGW into a user plane and a control plane to perform separate deployment. The control plane includes control protocols and a function of supporting the user plane, for example, controlling an Evolved Universal Terrestrial Radio Access (E-UTRA) network access connection, controlling a routing path of an established network connection to support user mobility, and controlling network resource allocation to meet a user requirement. The user plane is used to transmit a data flow. User plane gateways (also referred to as PGW-U) may be deployed in a distributed manner. Compared with a conventional PGW, the user plane gateway may be deployed at a lower layer, such as a location close to a residential access network (RAN). The lower deployment means approaching a user side from a perspective of network control. End-to-end (E2E) data plane transmission of some local services (of a local server) may be locally performed, thereby greatly reducing a transmission delay. Moreover, a control plane gateway (also referred to as PGW-C) is still deployed in a centralized manner.

In the concept of PGW CU separation, there is no offline charging solution for the CU separation.

SUMMARY

Embodiments of the present disclosure provide a charging method and apparatus in order to implement offline charging during PGW CU separation.

According to a first aspect, a system is provided, including a control plane gateway and a user plane gateway. The control plane gateway sends a first charging trigger event to the user plane gateway. The first charging trigger event is used to trigger the user plane gateway to generate service usage information. When detecting that the first charging trigger event occurs, the user plane gateway generates the service usage information, and sends the service usage information to the control plane gateway. The control plane gateway generates a charging request according to the service usage information, and sends the charging request to a charging system.

The first charging trigger event is monitored using the control plane gateway or the user plane gateway, and a traffic volume used by a user can be charged after the first charging trigger event occurs, thereby implementing charging in a CU separation architecture.

According to a second aspect, a charging method is provided, including sending, by a control plane gateway, a first charging trigger event to a user plane gateway, where the first charging trigger event is used to trigger the user plane gateway to generate service usage information, receiving, by the control plane gateway, the service usage information from the user plane gateway, and generating a charging request according to the service usage information, and sending, by the control plane gateway, the charging request to a charging system.

With reference to the second aspect, in a first possible implementation of the second aspect, the control plane gateway further receives the first charging trigger event from the user plane gateway, the control plane gateway generates the charging request further according to the first charging trigger event.

In this way, the service usage information may correspond to the first charging trigger event, and accuracy of charging is ensured when multiple first charging trigger events occur.

With reference to the second aspect or the first possible implementation of the second aspect, in a second possible implementation, before the control plane gateway sends the first charging trigger event to the user plane gateway, the control plane gateway distinguishes the first charging trigger event from at least one charging trigger event.

According to a third aspect, a charging method is provided, including receiving, by a user plane gateway, a first charging trigger event from a control plane gateway, where the first charging trigger event is used to trigger the user plane gateway to generate service usage information, generating, by the user plane gateway, the service usage information when the user plane gateway detects that the first charging trigger event occurs, and sending, by the user plane gateway, the service usage information to the control plane gateway.

With reference to the third aspect, in a first possible implementation of the third aspect, when the first charging trigger event does not cause ending of a charging session or closing of a charging data record, before the user plane gateway sends the service usage information to the control plane gateway, the user plane gateway stores the first charging trigger event and the generated service usage information, and the user plane gateway accumulates subsequent service usage information all over again.

In this way, the user plane gateway may not send the service usage information to the control plane gateway until the first charging trigger event causes ending of the charging session or closing of the charging data record such that a data amount and frequency of information exchanged between the control plane gateway and the user plane gateway can be reduced, and a network resource can be saved.

With reference to the third aspect or the first possible implementation of the third aspect, in a second possible implementation, the user plane gateway receives at least one charging trigger event from the control plane gateway, where the at least one charging trigger event includes the first charging trigger event, and the user plane gateway distinguishes the first charging trigger event from the at least one charging trigger event.

With reference to the third aspect, or the first and the second possible implementations of the third aspect, in a third possible implementation, the user plane gateway further sends the first charging trigger event to the control plane gateway.

With reference to the second aspect and the third aspect, the service usage information is carried using a charging container.

According to a fourth aspect, a charging apparatus is provided, including a processor, a memory, a communications interface, and a bus. The processor, the memory, and the communications interface are connected using the bus. The memory is configured to store an instruction, the processor is configured to execute the instruction, and under control of the processor, the communications interface is configured to communicate with a user plane gateway. When the processor executes the instruction stored in the memory, the processor executes the method according to the second aspect.

According to a fifth aspect, a charging apparatus is provided, including a processor, a memory, a communications interface, and a bus. The processor, the memory, and the communications interface are connected using the bus. The memory is configured to store an instruction, the processor is configured to execute the instruction, and under control of the processor, the communications interface is configured to communicate with a control plane gateway. When the processor executes the instruction stored in the memory, the processor executes the method according to the third aspect.

According to a sixth aspect, a computer readable storage medium is provided. Executable program code is stored in the computer readable storage medium, and used to implement the method according to the second aspect.

According to a seventh aspect, a computer readable storage medium is provided. Executable program code is stored in the computer readable storage medium, and used to implement the method according to the third aspect.

According to an eighth aspect, a charging apparatus is provided. The charging apparatus includes modules configured to execute the method according to the second aspect.

According to a ninth aspect, a charging apparatus is provided. The charging apparatus includes modules configured to execute the method according to the third aspect.

According to a tenth aspect, a system is provided, including a control plane gateway and a user plane gateway. The control plane gateway sends a first charging trigger event to the user plane gateway. The first charging trigger event is used to trigger the user plane gateway to generate a charging request. After detecting that the first charging trigger event occurs, the user plane gateway generates the charging request, and sends the charging request to the control plane gateway. The control plane gateway sends the charging request to a charging system.

The first charging trigger event is monitored using the control plane gateway or the user plane gateway, and a traffic volume used by a user can be charged after the first charging trigger event occurs, thereby implementing charging in a CU separation architecture.

According to an eleventh aspect, a charging method is provided, including sending, by a control plane gateway, a first charging trigger event to a user plane gateway, where the first charging trigger event is used to trigger the user plane gateway to generate a charging request, receiving, by the control plane gateway, the charging request from the user plane gateway, and sending, by the control plane gateway, the charging request to a charging system.

With reference to the eleventh aspect, in a first possible implementation of the eleventh aspect, before the control plane gateway sends the first charging trigger event to the user plane gateway, the control plane gateway distinguishes the first charging trigger event from at least one charging trigger event.

According to a twelfth aspect, a charging method is provided, including receiving, by a user plane gateway, a first charging trigger event from a control plane gateway, where the first charging trigger event is used to trigger the user plane gateway to generate a charging request, generating, by the user plane gateway, the charging request according to service usage information when the user plane gateway detects that the first charging trigger event occurs, and sending, by the user plane gateway, the charging request to the control plane gateway.

With reference to the twelfth aspect, in a first possible implementation of the twelfth aspect, when the first charging trigger event does not cause ending of a charging session or closing of a charging data record, before the user plane gateway sends the generated charging request to the control plane gateway, the user plane gateway stores the first charging trigger event and the service usage information generated before the first charging trigger event occurs, and the user plane gateway accumulates subsequent service usage information all over again.

In this way, the user plane gateway may not send the charging request to the control plane gateway until the first charging trigger event causes ending of the charging session or closing of the charging data record such that a data amount and frequency of information exchanged between the control plane gateway and the user plane gateway can be reduced, and a network resource can be saved.

With reference to the twelfth aspect or the first possible implementation of the twelfth aspect, in a second possible implementation, the user plane gateway receives at least one charging trigger event from the control plane gateway, where the at least one charging trigger event includes the first charging trigger event, and the user plane gateway distinguishes the first charging trigger event from the at least one charging trigger event.

According to a thirteenth aspect, a charging apparatus is provided, including a processor, a memory, a communications interface, and a bus. The processor, the memory, and the communications interface are connected using the bus. The memory is configured to store an instruction, the processor is configured to execute the instruction, and under control of the processor, the communications interface is configured to communicate with a user plane gateway. When the processor executes the instruction stored in the memory, the processor executes the method according to the eleventh aspect.

According to a fourteenth aspect, a charging apparatus is provided, including a processor, a memory, a communications interface, and a bus. The processor, the memory, and the communications interface are connected using the bus. The memory is configured to store an instruction, the processor is configured to execute the instruction, and under control of the processor, the communications interface is configured to communicate with a control plane gateway. When the processor executes the instruction stored in the memory, the processor executes the method according to the twelfth aspect.

According to a fifteenth aspect, a computer readable storage medium is provided. Executable program code is stored in the computer readable storage medium, and used to implement the method according to the eleventh aspect.

According to a sixteenth aspect, a computer readable storage medium is provided. Executable program code is stored in the computer readable storage medium, and used to implement the method according to the twelfth aspect.

According to a seventeenth aspect, a charging apparatus is provided. The charging apparatus includes modules configured to execute the method according to the eleventh aspect.

According to an eighteenth aspect, a charging apparatus is provided. The charging apparatus includes modules configured to execute the method according to the twelfth aspect.

According to the technical solutions provided in the embodiments of the present disclosure, the first charging trigger event is monitored using the control plane gateway or the user plane gateway, and a traffic volume used by a user can be charged after the first charging trigger event occurs, thereby implementing charging in a CU separation architecture. Further, the user plane gateway may not send the service usage information to the control plane gateway until the first charging trigger event causes ending of the charging session or closing of the charging data record such that a data amount and frequency of information exchanged between the control plane gateway and the user plane gateway are reduced, and a network resource is saved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

In the following description, to illustrate rather than limit, specific details such as a particular system structure, an interface, and a technology are provided to make a thorough understanding of the present disclosure. However, a person skilled in the art should know that the present disclosure may be practiced in other embodiments without these specific details. In other cases, detailed descriptions of well-known apparatuses, circuits, and methods are omitted such that the present disclosure is described without being obscured by unnecessary details.

For ease of understanding and describing embodiments provided in the present disclosure, several concepts related to the present disclosure are first described. For a charging trigger event, when the charging trigger event occurs, charging information generated before the event occurs needs to be packetized and added into a charging data record, and subsequently, charging information needs to be accumulated all over again. For example, a user location change is configured as a charging trigger event. If a user is originally located in an area A, and then moves to an area B, charging information generated when the user uses a service in the area A and charging information generated when the user uses a service in the area B need to be separately listed in a charging data record.

Figure 1:
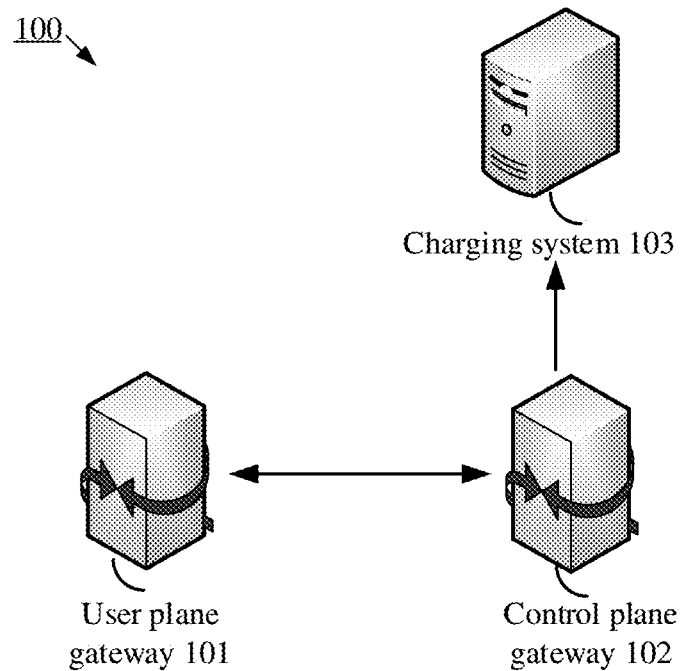
FIG. 1 is a schematic diagram of a network architecture to which an embodiment of the present disclosure is applied.

FIG. 1 is a schematic diagram of a network architecture 100 to which an embodiment of the present disclosure is applied in order to implement offline charging in a CU separation architecture. A user plane gateway 101 is configured to forward and process a data flow, and a control plane gateway 102 is configured to provide a charging interface to the outside. In this embodiment of the present disclosure, the user plane gateway 101 or the control plane gateway 102 monitors a charging trigger event. When the charging trigger event occurs, the user plane gateway 101 cooperates with the control plane gateway 102 to send a charging request to a charging system 103 for charging in order to implement the offline charging in the CU separation architecture.

Figure 2:
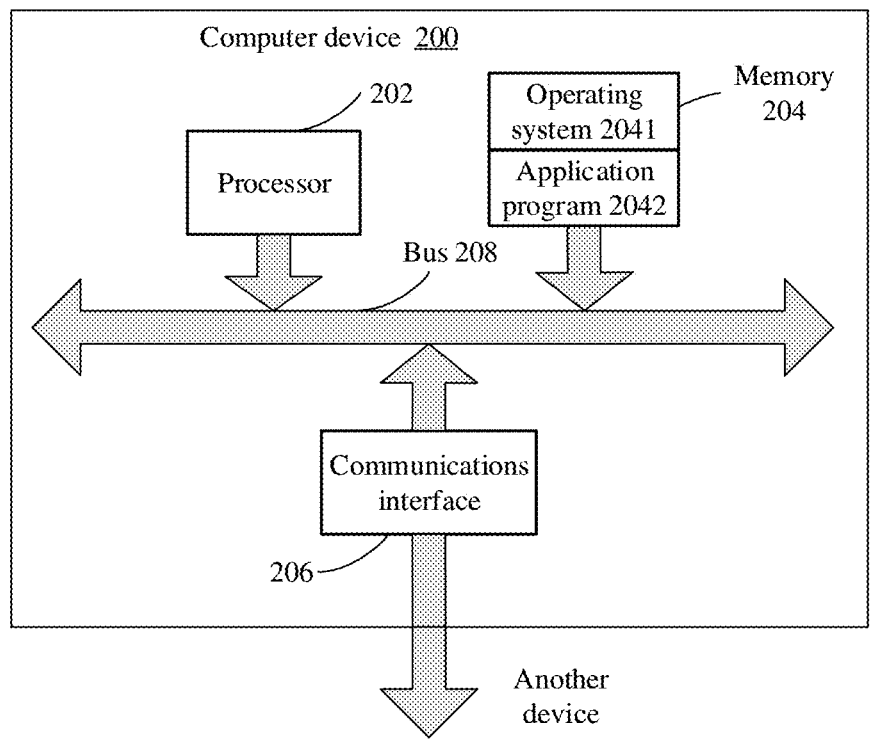
FIG. 2 is a schematic diagram of a hardware structure of a computer device according to an embodiment of the present disclosure.

The user plane gateway 101 and the control plane gateway 102 may be implemented in a form of a computer device. FIG. 2 is a schematic diagram of a hardware structure of a computer device 200 according to an embodiment of the present disclosure. As shown in FIG. 2, the computer device 200 includes a processor 202, a memory 204, a communications interface 206, and a bus 208. The processor 202, the memory 204, and the communications interface 206 implement mutual communication and connection using the bus 208.

The processor 202 may be a general-purpose central processing unit (CPU), a microprocessor, an application-specific integrated circuit (ASIC), or one or more integrated circuits, and is configured to execute a related program to implement a technical solution provided in this embodiment of the present disclosure.

The memory 204 may be a read only memory (ROM), a static storage device, a dynamic storage device, or a random access memory (RAM). The memory 204 may store an operating system 2041 or an application program 2042. When the technical solution provided in this embodiment of the present disclosure is implemented using software or firmware, program code used to implement the technical solution provided in this embodiment of the present disclosure is stored in the memory 204, and is executed by the processor 202.

Using a transceiver apparatus (not shown), for example but not limited to a transceiver, the communications interface 206 communicates with another device or another communications network.

The bus 208 may include a channel to transfer information between components (for example, the processor 202, the memory 204, and the communications interface 206).

When the computer device 200 is the control plane gateway 102, the processor 202 is configured to send a first charging trigger event to a user plane gateway, where the first charging trigger event is used to trigger the user plane gateway to generate service usage information, receive the service usage information from the user plane gateway, generate a charging request according to the service usage information, and send the charging request to a charging system.

When the computer device 200 is the user plane gateway 101, the processor 202 is configured to receive a first charging trigger event from a control plane gateway, where the first charging trigger event is used to trigger the user plane gateway to generate service usage information, generate the service usage information when it is detected that the first charging trigger event occurs, and send the generated service usage information to the control plane gateway.

Figure 3:
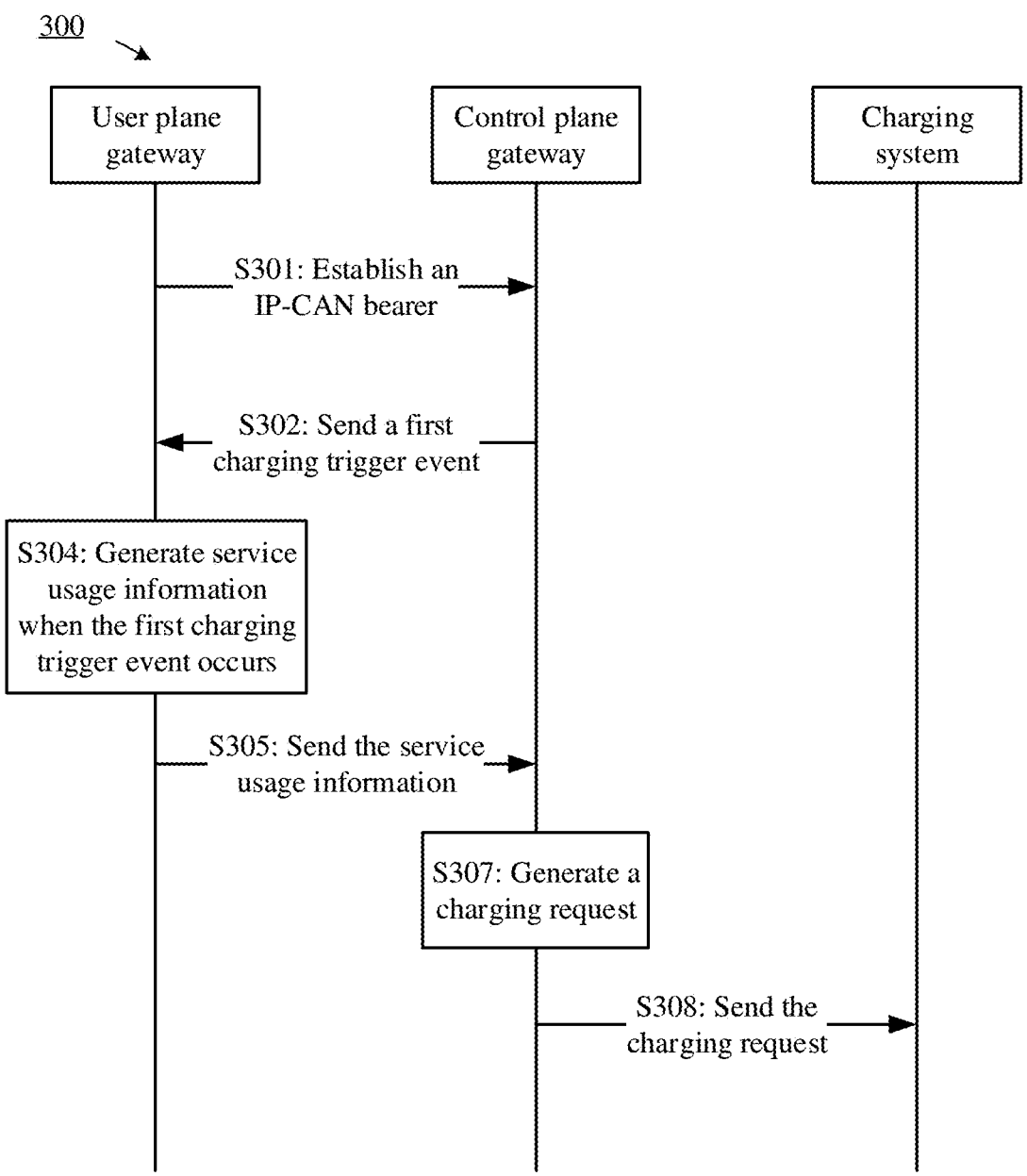
FIG. 3 is an example flowchart of a charging method according to an embodiment of the present disclosure.

FIG. 3 is an example flowchart of a charging method 300 according to an embodiment of the present disclosure. During specific implementation, the charging method 300 may be executed by the user plane gateway 101 and the control plane gateway 102 in FIG. 1.

Step S301: A user plane gateway and a control plane gateway establish an Internet Protocol (IP)-connectivity access network (CAN) bearer.

Step S302: The control plane gateway sends a first charging trigger event to the user plane gateway, where the first charging trigger event is used to trigger the user plane gateway to generate service usage information.

Step S303 (not shown): The user plane gateway receives the first charging trigger event from the control plane gateway, where the first charging trigger event is used to trigger the user plane gateway to generate the service usage information.

The service usage information includes service usage amount. The service usage information may further include at least one of quality of service (QoS) information, a rating group, a service identifier, a policy and charging control (PCC) rule identifier, or an application detection and control (ADC) rule identifier.

The service usage amount includes at least one of service use time, uplink traffic, downlink traffic, or duration.

Step S304: When the user plane gateway detects that the first charging trigger event occurs, the user plane gateway generates the service usage information.

Further, the first charging trigger event may be a trigger event monitored by the user plane gateway, or may be a trigger event monitored by the control plane gateway.

When the first charging trigger event is the trigger event monitored by the user plane gateway, the user plane gateway may obtain the first charging trigger event in the following manners. Before the control plane gateway sends the first charging trigger event to the user plane gateway, the control plane gateway distinguishes the first charging trigger event from at least one charging trigger event, and then sends the first charging trigger event to the user plane gateway. Alternatively, the user plane gateway receives at least one charging trigger event from the control plane gateway, where the at least one charging trigger event includes the first charging trigger event, and the user plane gateway distinguishes the first charging trigger event from the at least one charging trigger event.

When the first charging trigger event is the trigger event monitored by the user plane gateway, "the control plane gateway sends a first charging trigger event to the user plane gateway" in step S302 includes that the control plane gateway sends a monitor instruction to the user plane gateway. The monitor instruction carries the first charging trigger event, and instructs the user plane gateway to monitor the first charging trigger event. "The user plane gateway receives the first charging trigger event from the control plane gateway" in step S303 includes that the user plane gateway receives the monitor instruction from the control plane gateway. The monitor instruction carries the first charging trigger event, and instructs the user plane gateway to monitor the first trigger event. That the user plane gateway detects that the first charging trigger event occurs includes that the user plane gateway itself detects that the first charging trigger event occurs.

When the first charging trigger event is the trigger event monitored by the control plane gateway, the control plane gateway may obtain the first charging trigger event in the following manners. The control plane gateway distinguishes the first charging trigger event from at least one charging trigger event. Alternatively, the user plane gateway receives at least one charging trigger event from the control plane gateway, and the at least one charging trigger event includes the first charging trigger event. The user plane gateway distinguishes the first charging trigger event from the at least one charging trigger event, and then sends the first charging trigger event to the control plane gateway.

When the first charging trigger event is the trigger event monitored by the control plane gateway, "the control plane gateway sends a first charging trigger event to the user plane gateway" in step S302 includes that the control plane gateway sends a notification message to the user plane gateway. The notification message carries the first charging trigger event, and indicates that the first trigger event occurs. "The user plane gateway receives the first charging trigger event from the control plane gateway" in step S303 includes that the user plane gateway receives the notification message from the control plane gateway. The notification message carries the first charging trigger event, and indicates that the first trigger event occurs. When the user plane gateway receives the notification message that indicates that the first charging trigger event occurs, the user plane gateway detects that the first charging trigger event occurs.

Step S305: The user plane gateway sends the service usage information to the control plane gateway.

Optionally, the user plane gateway further sends the first charging trigger event to the control plane gateway.

Step S306 (not shown): The control plane gateway receives the service usage information from the user plane gateway.

Optionally, the control plane gateway further receives the first charging trigger event from the user plane gateway.

Optionally, when the first charging trigger event causes ending of a charging session or closing of a charging data record, the user plane gateway sends the generated service usage information to the control plane gateway. In this way, a data amount and frequency of information exchanged between the control plane gateway and the user plane gateway can be reduced, and a network resource can be saved.

Optionally, when the first charging trigger event does not cause ending of a charging session or closing of a charging data record, before the user plane gateway sends the generated service usage information to the control plane gateway, the user plane gateway stores the first charging trigger event and the service usage information, and the user plane gateway accumulates subsequent service usage information all over again.

Optionally, the user plane gateway may record the service usage information in a form of a charging data record, and send multiple recorded charging data records to the control plane gateway together, thereby reducing frequency of interaction between the user plane gateway and the control plane gateway, and reducing network consumption.

Step S307: The control plane gateway generates a charging request according to the service usage information.

The control plane gateway generates the charging request further according to the first charging trigger event sent by the user plane gateway and at least one of configuration information of the control plane gateway, user information, network information, or service information. The configuration information of the control plane gateway, the user information, the network information, and the service information include a user identifier, a serving node type, a serving gateway (SGW) address, and a time zone.

Optionally, the control plane gateway may generate a charging data record according to the service usage information, and send the charging data record to a charging system after a specific time. Alternatively, after a specific quantity of charging data records exist, the control plane gateway sends the charging data records to a charging system.

Step S308: The control plane gateway sends the charging request to a charging system.

According to the technical solution provided in this embodiment of the present disclosure, the first charging trigger event is monitored using the control plane gateway or the user plane gateway, and a traffic volume used by a user can be charged after the first charging trigger event occurs, thereby implementing charging in a CU separation architecture. Further, the user plane gateway may not send the service usage information to the control plane gateway until the first charging trigger event causes ending of the charging session or closing of the charging data record such that a data amount and frequency of information exchanged between the control plane gateway and the user plane gateway are reduced, and a network resource is saved. In addition, when the service usage information sent by the user plane gateway includes only the service usage amount, the user plane gateway does not need to obtain other information used to generate the charging request, and pressure on the user plane gateway can be reduced. When the service usage information sent by the user plane gateway further includes the foregoing information, such as the QoS and the rating group, the control plane gateway does not need to obtain the information, and pressure on the control plane gateway can be reduced.

Figure 4:
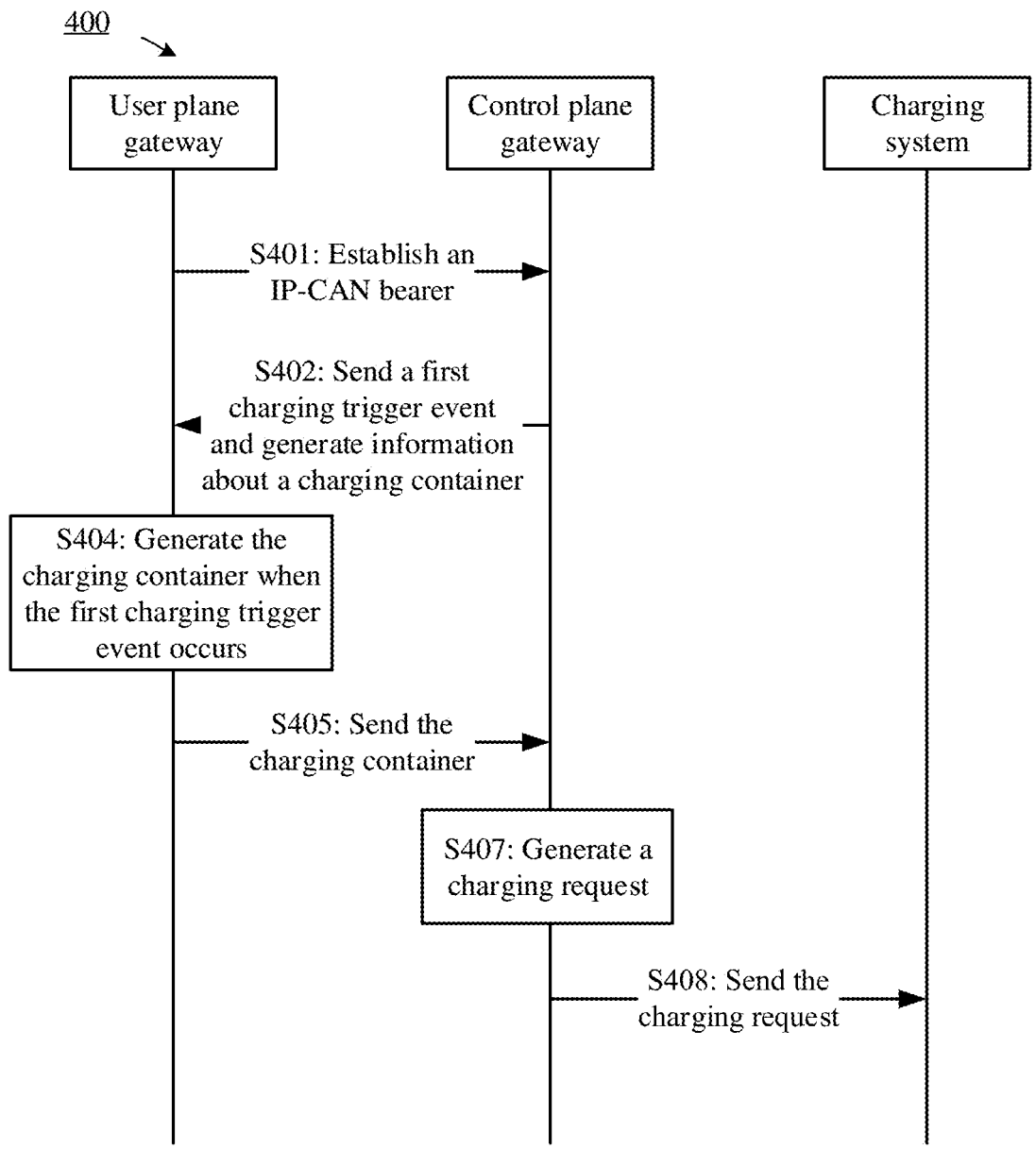
FIG. 4 is an example flowchart of a charging method according to an embodiment of the present disclosure.

In a specific implementation of the embodiment of the present disclosure, service usage information may be carried using a charging container. Referring to FIG. 4, a specific process is as follows.

The charging container is an important part of a charging request and a charging data record, and is a structured data set. The charging container includes service usage amount, and may further include at least one of information such as container opening and closing time, a rating group, a service identifier, or a container closing charging trigger event. The charging container may be represented using a field "service data container". In an implementation, "service data container" may include the following fields:

Service-Data-Container::=<AVP Header: TBD>
 [AF-Correlation-Information]
 [Charging-Rule-Base-Name]
 [Accounting-Input-Octets]
 [Accounting-Output-Octets]
 [Accounting-Input-Packets]
 [Accounting-Output-Packets]
 [Local-Sequence-Number]
 [QoS-Information]
 [Rating-Group]
 [Change-Time]
 [Service-Identifier]
 [Service-Specific-Info]
 [SGSN-Address]
 [Time-First-Usage]
 [Time-Last-Usage]
 [Time-Usage]
 [Change-Condition]
 [3 GPP-User-Location-Info]

Step S401: A user plane gateway and a control plane gateway establish an IP-CAN bearer.

Step S402: The control plane gateway sends, to the user plane gateway, a first charging trigger event and information used to generate a charging container, where the first charging trigger event is used to trigger the user plane gateway to generate the charging container.

Optionally, the information that is sent by the control plane gateway to the user plane gateway and used to generate the charging container includes information that is required for generating the charging container but is lacking in the user plane gateway. Further, the information used to generate the charging container includes at least one of a serving general packet radio service (GPRS) support node (SGSN) address, user location information, a user presence reporting area status, or closed subscriber group (CSG) information of a user.

Step S403 (not shown): The user plane gateway receives, from the control plane gateway, the first charging trigger event and the information used to generate the charging container, where the first charging trigger event is used to trigger the user plane gateway to generate the charging container.

Further, the first charging trigger event and the information used to generate the charging container may be sent using one or more messages. This is not limited in the present disclosure.

Step S404: When the user plane gateway detects that the first charging trigger event occurs, the user plane gateway generates the charging container according to the information used to generate the charging container.

A specific description of step S404 is the same as that of step S304 in the embodiment in FIG. 3, and details are not repeatedly described herein. It should be noted that, in the specific description of step S404, steps S302 and S303 in the specific description of step S304 should be respectively replaced with steps S402 and S403 in the embodiment in FIG. 4.

Step S405: The user plane gateway sends the generated charging container to the control plane gateway.

Step S406 (not shown): The control plane gateway receives the charging container from the user plane gateway.

Step S407: The control plane gateway generates a charging request according to the charging container.

It should be understood that, the embodiment in FIG. 4 is a specific implementation of the embodiment in FIG. 3, some feature descriptions in the embodiment in FIG. 3 are applicable to this embodiment, and details are not repeatedly described herein.

According to the technical solution provided in this embodiment of the present disclosure, the first charging trigger event is monitored using the control plane gateway or the user plane gateway, and a traffic volume used by a user can be charged after the first charging trigger event occurs, thereby implementing charging in a CU separation architecture. Further, the user plane gateway may not send the charging container to the control plane gateway until the first charging trigger event causes ending of the charging session or closing of the charging data record such that a data amount and frequency of information exchanged between the control plane gateway and the user plane gateway are reduced, and a network resource is saved.

Figure 5:
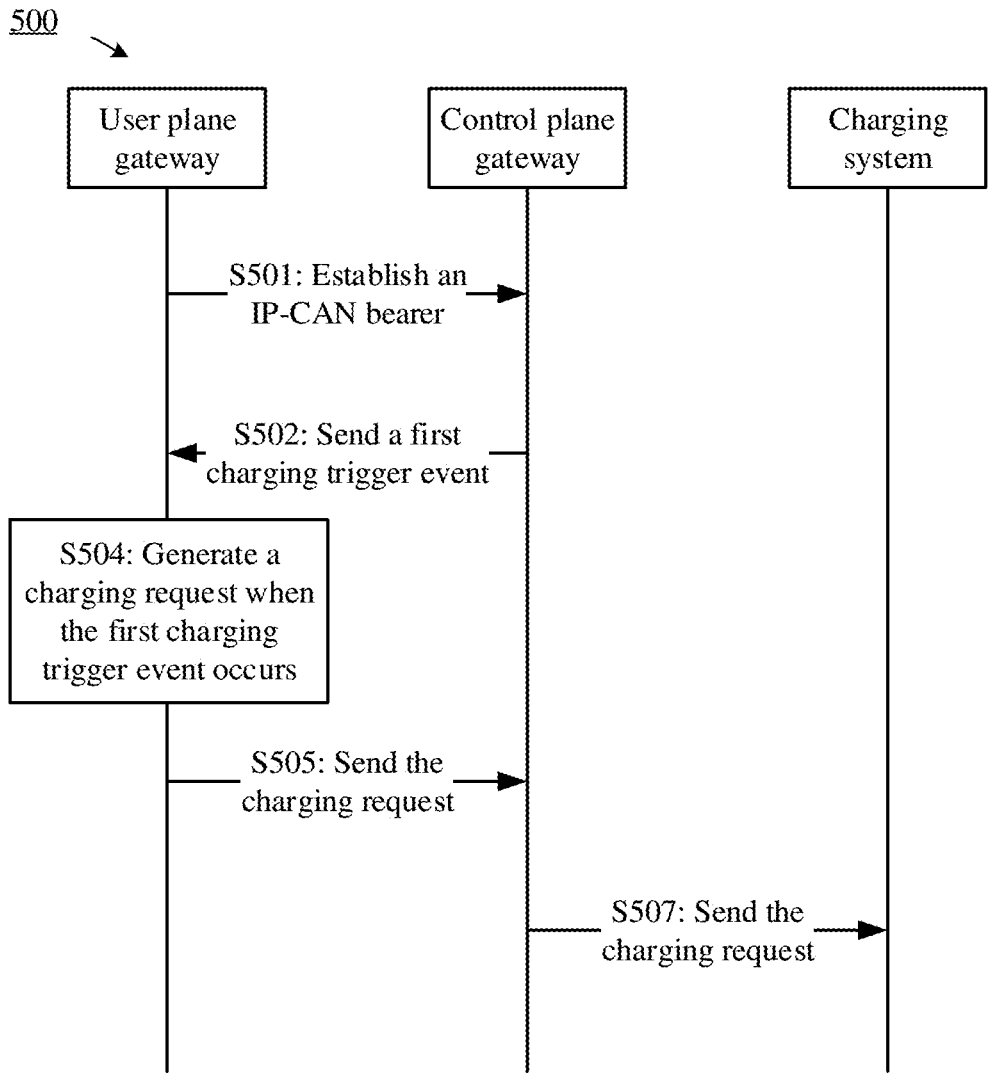
FIG. 5 is an example flowchart of a charging method according to an embodiment of the present disclosure.

FIG. 5 is an example flowchart of a charging method 500 according to an embodiment of the present disclosure. During specific implementation, the charging method 500 may be executed by the user plane gateway 101 and the control plane gateway 102 in FIG. 1.

Step S501: A user plane gateway and a control plane gateway establish an IP-CAN bearer.

Step S502: The control plane gateway sends a first charging trigger event to the user plane gateway, where the first charging trigger event is used to trigger the user plane gateway to generate a charging request.

The control plane gateway further sends, to the user plane gateway, information used to generate the charging request. The information includes at least one of user information, network information, or service information.

Step S503 (not shown): The user plane gateway receives the first charging trigger event from the control plane gateway, where the first charging trigger event is used to trigger the user plane gateway to generate the charging request.

Step S504: When the user plane gateway detects that the first charging trigger event occurs, the user plane gateway generates the charging request according to service usage information.

A specific description of step S504 is the same as that of step S304 in the embodiment in FIG. 3, and details are not repeatedly described herein. It should be noted that, in the specific description of step S504, steps S302 and S303 in the specific description of step S304 should be respectively replaced with steps S502 and S503 in the embodiment in FIG. 5.

The user plane gateway generates the charging request further according to the first charging trigger event and configuration information of the user plane gateway.

Optionally, the user plane gateway generates the charging request further according to cached charging information caused by a charging trigger event before the first charging trigger event occurs. The cached charging information includes the service usage information.

Step S505: The user plane gateway sends the charging request to the control plane gateway.

Step S506 (not shown): The control plane gateway receives the charging request from the user plane gateway.

Optionally, when the first charging trigger event may cause ending of a charging session or closing of a charging data record, the user plane gateway sends the charging request to the control plane gateway. In this way, a data amount and frequency of information exchanged between the control plane gateway and the user plane gateway can be reduced, and a network resource can be saved.

Optionally, when the first charging trigger event does not cause ending of a charging session or closing of a charging data record, before the user plane gateway sends the charging request to the control plane gateway, the user plane gateway stores the first charging trigger event and charging information generated before the first charging trigger event occurs, and the user plane gateway accumulates subsequent service usage information all over again.

Optionally, the user plane gateway may record the charging information in a form of a charging data record, and send multiple recorded charging data records to the control plane gateway together with the charging request, thereby reducing frequency of interaction between the user plane gateway and the control plane gateway, and reducing network consumption.

Step S507: The control plane gateway sends the charging request to a charging system.

According to the technical solution provided in this embodiment of the present disclosure, the first charging trigger event is monitored using the control plane gateway or the user plane gateway, and a traffic volume used by a user can be charged after the first charging trigger event occurs, thereby implementing charging in a CU separation architecture. Further, the user plane gateway may not send the charging request to the control plane gateway until the first charging trigger event causes ending of the charging session or closing of the charging data record such that a data amount and frequency of information exchanged between the control plane gateway and the user plane gateway are reduced, and a network resource is saved.

Figure 6:
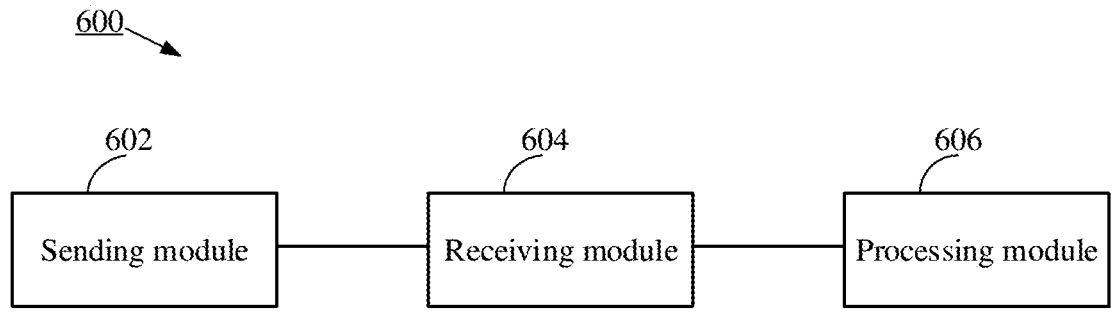
FIG. 6 is a schematic structural diagram of a charging apparatus according to an embodiment of the present disclosure.

FIG. 6 is a schematic structural diagram of a charging apparatus 600 according to an embodiment of the present disclosure. The charging apparatus 600 includes a sending module 602, a receiving module 604, and a processing module 606. The charging apparatus 600 is the control plane gateway 102 shown in FIG. 1 or the computer device 200 shown in FIG. 2.

The sending module 602 is configured to send a first charging trigger event to a user plane gateway. The first charging trigger event is used to trigger the user plane gateway to generate service usage information.

The receiving module 604 is configured to receive the service usage information from the user plane gateway.

The processing module 606 is configured to generate a charging request according to the service usage information.

The sending module 602 is further configured to send the charging request to a charging system.

In a specific implementation of this embodiment of the present disclosure, the service usage information may be carried using a charging container.

Optionally, the receiving module 604 is further configured to receive the first charging trigger event from the user plane gateway. The processing module 606 is further configured to generate the charging request according to the first charging trigger event.

Optionally, before the sending module 602 sends the first charging trigger event to the user plane gateway, the processing module 606 is further configured to distinguish the first charging trigger event from at least one charging trigger event.

Figure 7:
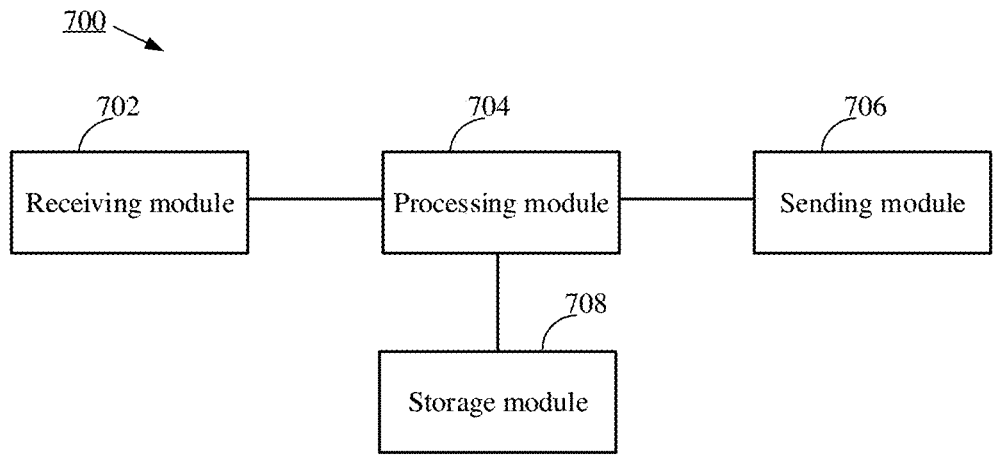
FIG. 7 is a schematic structural diagram of a charging apparatus according to an embodiment of the present disclosure.

FIG. 7 is a schematic structural diagram of a charging apparatus 700 according to an embodiment of the present disclosure. The charging apparatus 700 includes a receiving module 702, a processing module 704, and a sending module 706. The charging apparatus 700 is the user plane gateway 101 shown in FIG. 1 or the computer device 200 shown in FIG. 2.

The receiving module 702 is configured to receive a first charging trigger event from a control plane gateway. The first charging trigger event is used to trigger the processing module 704 to generate service usage information.

The processing module 704 is configured to generate the service usage information when it is detected that the first charging trigger event occurs.

The sending module 706 is configured to send the service usage information to the control plane gateway.

In a specific implementation of this embodiment of the present disclosure, the service usage information may be carried using a charging container.

Optionally, the charging apparatus 700 further includes a storage module 708. When the first charging trigger event does not cause ending of a charging session or closing of a charging data record, before the sending module 706 sends the service usage information to the control plane gateway, the storage module 708 is configured to store the first charging trigger event and the generated service usage information. The processing module 704 is further configured to accumulate subsequent service usage information all over again.

Optionally, the receiving module 702 is further configured to receive at least one charging trigger event from the control plane gateway, and the at least one charging trigger event includes the first charging trigger event. The processing module 704 is further configured to distinguish the first charging trigger event from the at least one charging trigger event.

Optionally, the sending module 706 is further configured to send the first charging trigger event to the control plane gateway.

Figure 8:
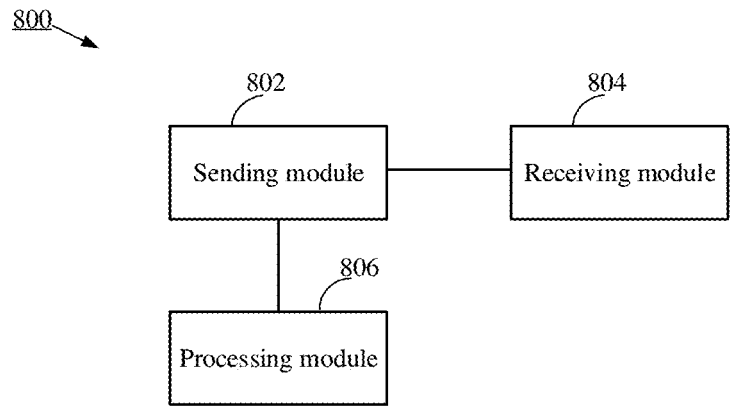
FIG. 8 is a schematic structural diagram of a charging apparatus according to an embodiment of the present disclosure.

FIG. 8 is a schematic structural diagram of a charging apparatus 800 according to an embodiment of the present disclosure. The charging apparatus 800 includes a sending module 802 and a receiving module 804. The charging apparatus 800 is the control plane gateway 102 shown in FIG. 1 or the computer device 200 shown in FIG. 2.

The sending module 802 is configured to send a first charging trigger event to a user plane gateway. The first charging trigger event is used to trigger the user plane gateway to generate a charging request.

The receiving module 804 is configured to receive the charging request from the user plane gateway.

The sending module 802 is further configured to send the charging request to a charging system.

Optionally, the charging apparatus 800 further includes a processing module 806. Before the sending module 802 sends the first charging trigger event to the user plane gateway, the processing module 806 distinguishes the first charging trigger event from at least one charging trigger event.

Figure 9:
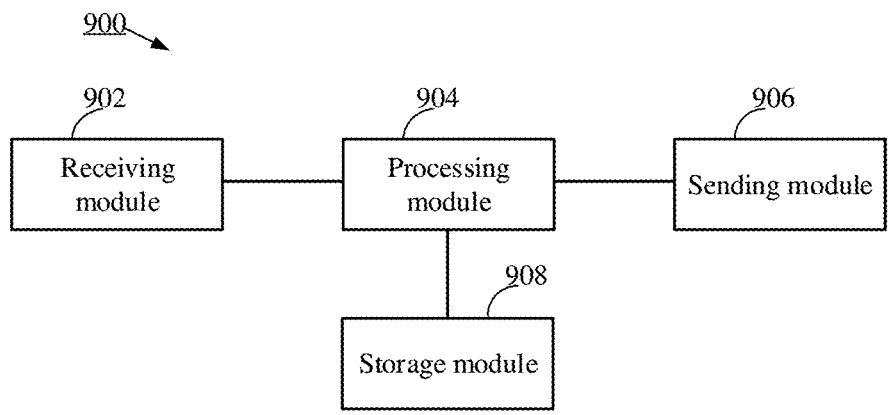
FIG. 9 is a schematic structural diagram of a charging apparatus according to an embodiment of the present disclosure.

FIG. 9 is a schematic structural diagram of a charging apparatus 900 according to an embodiment of the present disclosure. The charging apparatus 900 includes a receiving module 902, a processing module 904, and a sending module 906. The charging apparatus 900 is the user plane gateway 101 shown in FIG. 1 or the computer device 200 shown in FIG. 2.

The receiving module 902 is configured to receive a first charging trigger event from a control plane gateway. The first charging trigger event is used to trigger a user plane gateway to generate a charging request.

The processing module 904 is configured to generate the charging request according to service usage information when it is detected that the first charging trigger event occurs.

The sending module 906 is configured to send the charging request to the control plane gateway.

Optionally, the charging apparatus 900 further includes a storage module 908. When the first charging trigger event does not cause ending of a charging session or closing of a charging data record, before the sending module 906 sends the generated charging request to the control plane gateway, the storage module 908 is configured to store the first charging trigger event and the service usage information generated before the first charging trigger event occurs. The processing module 904 accumulates subsequent service usage information all over again.

Optionally, the receiving module 902 is further configured to receive at least one charging trigger event from the control plane gateway, and the at least one charging trigger event includes the first charging trigger event. The processing module 904 is further configured to distinguish the first charging trigger event from the at least one charging trigger event.

A "module" in the embodiments from FIG. 6 to FIG. 9 may be an ASIC, an electronic circuit, a processor and a memory that are used for executing one or more software or firmware programs, a combinatorial logic circuit, or another component providing the foregoing functions. Optionally, the foregoing charging apparatus is implemented in a form of a computer device, the foregoing receiving module and sending module may be implemented using a processor, a memory, and a communications interface of the computer device, the foregoing processing module may be implemented using the processor and the memory of the computer device, and the foregoing storage module may be implemented using the memory of the computer device.

It should be noted that, although the computer device 200 shown in FIG. 2 shows only the processor 202, the memory 204, the communications interface 206, and the bus 208, during specific implementation, a person skilled in the art should understand that the foregoing charging apparatus further includes other devices required for normal running. Moreover, according to specific requirements, a person skilled in the art should understand that the foregoing charging apparatus may further include a hardware device for implementing another additional function. In addition, a person skilled in the art should understand that the foregoing charging apparatus may also include only devices required for implementing the embodiments of the present disclosure, but does not necessarily include all the devices shown in FIG. 2.

In addition, functional units in the embodiments of the present disclosure may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or the part contributing to other approaches, or all or a part of the technical solutions may be implemented in the form of a software product. The computer software product is stored in a storage medium and includes several instructions for instructing a computer device (that may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A charging method implemented by a control plane gateway, the charging method comprising:
   determining that a first charging trigger event comprising a user location change has occurred;
   sending, to a user plane gateway in response to determining that the first charging event has occurred, a message to indicate to immediately report service usage information to the control plane gateway;
   receiving, from the user plane gateway, the service usage information; and
   sending, in response to receiving the service usage information from the user plane gateway, a charging request comprising the service usage information to a charging system that is separate from the user plane gateway and the control plane gateway.

2. The charging method of claim 1, wherein the service usage information is carried in a charging container.

3. The charging method of claim 1, wherein the service usage information comprises quality of service (QoS) information.

4. The charging method of claim 1, wherein the service usage information comprises a rating group.

5. The charging method of claim 1, wherein the service usage information comprises an application detection and control (ADC) rule identifier.

6. A system comprising a control plane gateway and a user plane gateway, wherein:
   the control plane gateway is configured to:
      determine that a first charging trigger event comprising a user location change has occurred;
      send, in response to determining that the first charging trigger event has occurred, a message to the user plane gateway to indicate to immediately report service usage information to the control plane gateway;
      receive the service usage information; and
      send, in response to receiving the service usage information, a charging request to a charging system that is separate from the control plane gateway; and
   the user plane gateway is configured to:
      receive, from the control plane gateway, the message indicating to immediately report service usage information to the control plane gateway;
      send, to the control plane gateway, the service usage information to prompt the control plane gateway to send the charging request,
      wherein the user plane gateway is separate from the charging system.

7. The system of claim 6, wherein the service usage information comprises quality of service (QoS) information.

8. The system of claim 6, wherein the service usage information comprises a rating group.

9. The system of claim 6, wherein the service usage information comprises an application detection and control (ADC) rule identifier.

10. The system of claim 6, wherein the service usage information is carried in a charging container.

11. A system comprising a control plane gateway, a user plane gateway and a charging system, wherein:
   the control plane gateway is configured to:
      determine that a first charging trigger event comprising a user location change has occurred;
      send, in response to determining that the user location change has occurred, a message to the user plane gateway to indicate immediately report service usage information to the control plane gateway;
      receive, the service usage information; and
      send, in response to receiving the service usage information, a charging request to a charging system that is separate from the control plane gateway;
   the user plane gateway is configured to:
      receive, from the control plane gateway, the message indicating to immediately report service usage information to the control plane gateway;
      send, to the control plane gateway in response to receiving the message, the service usage information to prompt the control plane gateway to send the charging request, wherein the user plane gateway is separate from the charging system; and
   the charging system is configured to receive the charging request from the control plane gateway.

12. The system of claim 11, wherein the service usage information comprises quality of service (QoS) information.

13. The system of claim 11, wherein the service usage information comprises a rating group.

14. The system of claim 11, wherein the service usage information comprises an application detection and control (ADC) rule identifier.

15. The system of claim 11, wherein the service usage information is carried in a charging container.

16. A charging apparatus, comprising
   a computer-readable storage medium configured to store programming instructions; and
   a processor coupled to the computer-readable storage medium, the programming instructions causing the processor to be configured to:
      determine that a first charging trigger event comprising a user location change has occurred;
      send, to a user plane gateway in response to determining that the first charging trigger event has occurred, a message to indicate to immediately report service usage information to the control plane gateway;
      receive, from the user plane gateway, the service usage information; and
      send, in response to receiving the service usage information from the user plane gateway, a charging request comprising the service usage information to a charging system that is separate from the user plane gateway and the control plane gateway.

17. The charging apparatus of claim 16, wherein the service usage information comprises quality of service (QoS) information.

18. The charging apparatus of claim 16, wherein the service usage information comprises a rating group.

19. The charging apparatus of claim 16, wherein the service usage information comprises an application detection and control (ADC) rule identifier.

20. The charging apparatus of claim 16, wherein the service usage information is carried in a charging container.

* * * * *